Feb. 26, 1957            H. RUEGER            2,782,907
GETTER ASSEMBLIES AND METHOD OF MAKING THE SAME
Filed Nov. 29, 1951
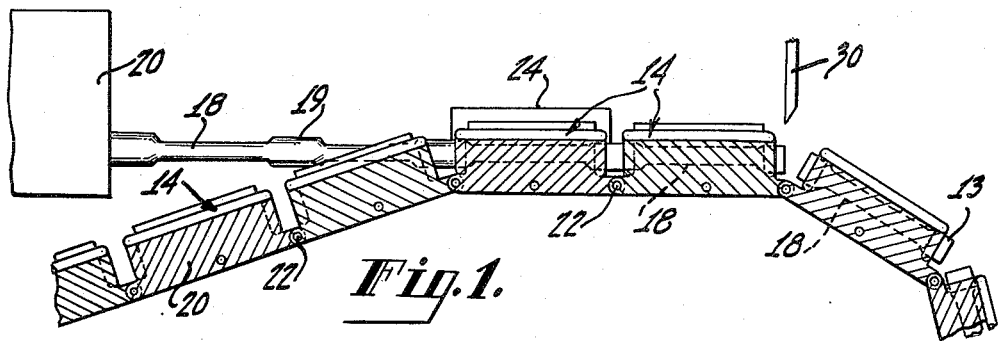
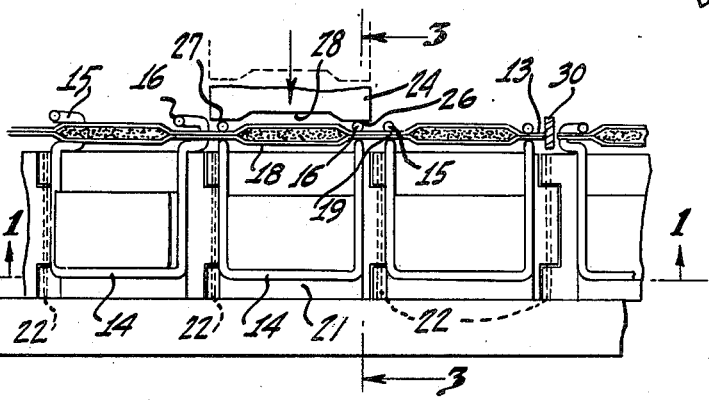
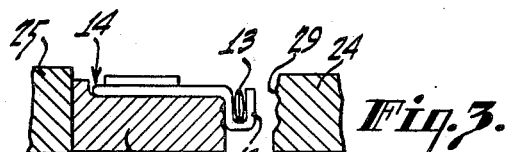
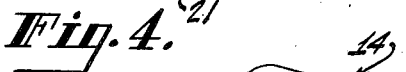
INVENTOR
HERMAN RUEGER
BY
William A. Zalesak
ATTORNEY

United States Patent Office 2,782,907
Patented Feb. 26, 1957

2,782,907

GETTER ASSEMBLIES AND METHOD OF MAKING THE SAME

Herman Rueger, Lancaster, Pa., assignor to Radio Corporation of America, a corporation of Delaware Application November 29, 1951, Serial No. 258,970

2 Claims. (Cl. 206—.4)

This invention relates to getter assemblies of the type comprising a trough containing getter material and a loop fixed to the trough for providing a path for electrical currents induced therein when flashing the getter, and more particularly concerns the joint between the trough and the loop.

It is a general practice to fix a getter assembly of the type discussed to an electron tube mount element by welding the loop at a portion thereof remote from the trough, to said element. The arms of the loop extending from the weld to the trough provide a support for the trough that is characterized by some springiness. As a result, impacts imparted to a mount including a getter of this type, impose a severe strain on the joint between the trough and loop. To withstand this strain without impairment, the joint referred to has heretofore been made by welding end portions of the trough, which normally are flattened for this purpose, to the free ends of the loop. The resultant welds provide joints that theoretically are not only strong enough to withstand the strain referred to without fracture, but in addition form good electrical contacts between the loop and trough required for inductive flashing of the getter.

While welded joints between the getter trough and loop are characterized by the theoretical advantages referred to, they introduce several serious practical problems, particularly in connection with mechanized fabrication of getter assemblies of this type. One manufacturing method involves first forming an integral structure from sheet metal stock, the structure including spaced troughs and flattened portions between the troughs. The next step involves filling the troughs with a suitable getter material such as barium berylliate, barium titanate, or other mixture or compound, usually in paste form. The filled troughs are then baked to transform the getter material to a coherent mass. The next step is to weld getter loops as aforementioned, to the flattened portions referred to. The final step is to sever the integral structure referred to at the flattened portions thereof, to provide individual getter assemblies comprising troughs containing getter material and having flattened end portions to which the loops referred to are welded.

One of the problems referred to arises as a consequence of the unavoidable deposit of some of the getter material on the flattened portions referred to during the step of filling the troughs with such material. When the getter material is baked to cause it to solidify, cohere and adhere to the troughs, the deposits of such material on the flattened portions of trough stock intermediate the troughs also become coherent and adherent on such flattened portions. The presence of such adherent getter material on the flattened portions referred to seriously impairs the welded joints subsequently made between such flattened portions and the getter loops. In some instances the joint is so weak that fracture thereof results from impacts incidental to the normal use of electron tubes having a getter assembly including such joint. It is believed the undesirable deposits of getter material referred to either electrically insulate a trough from a loop, at least partially to prevent flow of welding current, or become incorporated in the weld, thereby reducing the quantity of metal in the weld to a point where it is inadequate either for providing a mechanically strong joint, or a good electrical contact between the trough and loop.

While means have been proposed, for removing the undesirable deposits of getter material on the flattened portions of the getter troughs, such means have not been entirely successful. For example, where a brush is utilized for brushing off the undesirable deposits, there is danger that the brush may engage getter material in the troughs and thereby reduce a desired quantity of such material in the troughs. In addition, it is difficult to provide a brushing element that is highly efficient, particularly in view of the paste form of the getter material. Unless appreciably all of the getter material is removed from the flattened end portions of the troughs, the difficulty aforementioned, in making a weld joint between such flattened trough portions and loops, will persist.

Another problem arises from the fact that the getter loops are filled with getter material prior to the welding operation referred to. Therefore, heat developed during formation of the weld may flash prematurely at least a portion of the getter material, thereby reducing the amount of getter material available for evacuation of a tube envelope in which the getter is ultimately used.

Accordingly, it is an object of the invention to provide a novel getter assembly and method of making the same.

A further object is to provide a getter assembly of the trough-loop type having an improved joint between the trough and loop thereof.

Another object is to reduce the deleterious effect on a joint between a trough and loop of a getter assembly of undesirable deposits of getter material at the region of the joint.

A further object is to provide a getter assembly having a trough and a loop, wherein the joint between the trough and loop is characterized by good mechanical strength and desired electrical conductivity even though some getter material may be included in the joint.

Another object is to provide a bond between a trough filled with getter material, and a loop of a getter assembly without flashing the getter material.

A further object is to provide a getter assembly including a trough and loop wherein the trough is fixed to the loop in an improved clamped bond.

According to the invention, a getter assembly is provided including a trough filled with getter material and having end portions fixed to a loop in a clamped bond. The portions of the trough and loop included in the bond are of wavy or corrugated form to increase the strength of the bond and to improve the desired electrical connection between the trough and loop. The getter assembly referred to is made by a novel method including first filling a trough with getter material and then bonding the trough to a loop without danger of flashing the getter material and without regard to the presence of getter material at the region of the bond.

Further objects and advantages of the invention will become apparent from the following more detailed description thereof taken in connection with the appended drawing, in which:

Figure 1 is a side view partly in section along the line 1—1 of Fig. 2 and shows apparatus that may be used in practicing the method of the invention;

Figure 2 is a top view of the apparatus shown in Figure 1;

Figure 3 is a sectional view along the line 3—3 of Figure 2 and shows the trough and loop of a getter assembly in position for clamping;

Figure 4 is a sectional view similar to Figure 3 except that the trough and loop are shown clamped together; and Figure 5 is a perspective view of the novel getter assembly of the invention.

Referring now in more detail to the drawing, a getter assembly made by the method of the invention is shown best in Figure 5. It comprises a trough 10 having getter material 11 therein, such as barium berylliate, barium titanate, or other suitable getter compound. The end portions 12, 13 of the trough are flattened, both to provide end walls for the trough as well as to provide ears to facilitate a mounting of the trough on a loop or ring 14. The loop 14 is generally of U shape, the free ends of the arms thereof terminating in hooks 15, 16. The hooks referred to embrace the flattened portions 12, 13 of the trough in a firm bond or joint. The bond referred to is strengthened by the crimped or corrugated form of the hooks and the corresponding crimped form of the engaged portions of the flat end portions 12, 13.

The crimped or corrugated joint referred to is of particular advantage in getter assemblies of the type discussed. Such assemblies are sometimes fixed as by welding to a support element, not shown, of an electron tube. The weld is usually made between the transverse arm 17 of the loop and the support element referred to. When the getter assembly is fixed in this manner, impacts affecting the support element are transmitted to the trough 10 through the arms of the loop 14. If such impacts include tongue components, such components will become amplified in magnitude when transmitted to the trough 10, with consequent severe strains on the joint or bond between the loop and trough. These strains may be of sufficient severity to partly separate the arms of the hooks 15, 16. However, such partial separation will not involve loss of engagement of the trough by the hooks referred to. This is for the reason that such partial separation will merely cause the outwardly extending ridges on the hooks characteristic of their crimped form, to partly leave the corresponding depressions or indentations in the flat end portions 12, 13 of the trough. Adequate bond between the hook and trough will remain due to at least a partial engagement persisting between the ridges in the hooks 15, 16 and the corresponding depressions in the flattened end portions of the trough. It will be appreciated that if the engaging surfaces of the hooks 15, 16 and the flattened end portions referred to were rectilinear or planar, instead of crimped, a very slight separation of the hooks would result in complete failure of the bond between the loop 14 and the trough 10 with consequent hazards, as from impacts, of complete separation of the trough from its associated loop and damage to other interior components of a tube in which the getter assembly in question is used.

To the end that the crimped bond referred to shall persist in the presence of the most severe impacts normally to be anticipated, the dimensions of the ridges and indentations of the bond are made sufficiently large, in relation to the cross-section and bending characteristics of the hooks 15, 16, to assure at least a partial engagement therebetween under such conditions.

The novel method of the invention for fabricating a getter assembly of the type shown in Figure 1, is best exemplified in connection with the apparatus shown in Figures 1 to 4. A getter assembly of this type may be made by a machine including means, not shown, for forming strip stock to a shape including spaced troughs 18 separated by flattened portions 19. A dispenser, not shown, may be employed to fill automatically the troughs with a suitable getter material, either in paste or powder form. The filled troughs may then be baked in an oven 20, shown schematically in Figure 1. Suitable feed means, not shown, may be provided for transporting the stock in intermittent movements through stations for forming the troughs and flattened portions referred to, for filling the formed troughs with getter material, and for baking the filled troughs.

According to one exemplification of the method of the invention, a station is provided to which the formed, filled and baked getter troughs are intermittently transported, while still integral with the strip stock, and to which loops 14 are successively fed, also in intermittent motions. At such station the novel joints or bonds of a trough to a loop are made, as shown in Figures 1 and 2. The loops are supported for travel on links 21 joined hingedly at 22 to form a chain. The links include raised portions for holding the loops thereon. The hooks 15, 16 extend downwardly along a side of links 21, for a purpose to be described.

The station referred to includes a press member 24 and a backing member or anvil 25 between which the integral structure of filled getter troughs, and loops are fed with the flattened portions of the stock received by hooks 15, 16. Press member 24 is movable to and away from the anvil 25. The intermittent movements of the troughs 18 and the loops 14 are synchronized, by means not shown, so that during intermittent stoppage of the continuous multi-trough structure and the links 21, a trough and a loop will be disposed between the press member 24 and the anvil 25, as shown in Figure 2. Under this condition, movement of the press member towards the anvil will cause the leading face of the press member to engage the hooks 15, 16 to force the arms of the hooks against the flattened portions 12, 13 of a trough portion of the continuous structure referred to. The thrust of the press member 24 will be absorbed by the anvil 25.

The leading face of the press member is preferably provided with raised sides 26, 27. This provides a recess 28 intermediate to the raised sides adapted to receive the trough portion of a trough structure, the press member being thereby adapted to engage the hooks 15, 16, without contacting the trough proper.

The raised sides 26, 27 of the press member 24 have surfaces provided with ridges 29, shown in Figure 3. When the press member is therefore urged against the hooks 15, 16, corresponding ridges will be formed in the outer arms of the hooks which in turn form dimples or depressions in the flattened end portions 12, 13 of a trough, as shown in Figure 4.

The resultant ridge and dimple engagement between the hooks 15, 16 and the flattened end portions of the trough will persist even though some spring-back of the hooks should occur after the forming operation. This engagement will also continue during the application of appreciable stresses thereto, as by relatively severe impacts absorbed by an electron tube in which the getter assembly is used.

In this connection it will be noted that a ridge and dimple engagement occurs between the hooks and the flat end portions of the trough, relatively close to the transverse portions of the hooks. To cause loss of this engagement would involve a degree of separation of the arms of the hooks that is practically impossible under any condition of use. A very effective locking engagement is therefore provided.

After the troughs and loops have been joined as indicated, further travel of the integral trough stock and the links 21, disposes the troughs and loops in a predetermined position under a knife 30, which serves to sever the integral trough stock at the flattened portions 19 thereof intermediate adjacent hooks 15, 16 to form individual getter assemblies of the type shown in Figure 5.

It will be noted that one aspect of the method of the invention as exemplified by the apparatus described in the foregoing, comprises in its broader aspects the steps of feeding getter filled troughs and loops into registry position with the hooks of the loops embracing flattened end portions of the troughs, compressing the hooks to firmly engage the flattened end portions referred to, and cutting the trough stock between adjacent loop and trough assemblies to provide individual getter assemblies.

It will be appreciated that the fixing of the loops to the trough by the method described is accomplished without danger of prematurely flashing the getter material and results in an effective bond that is strong mechanically and electrically conductive, whether getter material is included in or is absent from the bond. The fabrication of getter assemblies of the type discussed is therefore appreciably facilitated by the invention, and an improved getter assembly is provided.

What is claimed is:

1. A getter assembly for an electron tube comprising a metal trough having a getter material therein and a U-shaped metal member having legs fixed at their free end portions to end portions of said trough to form a closed loop, said end portions of said trough comprising elongated flat ears, said free end portions of said legs defining U-shaped structures each having two parallel arms of substantially round cross-section, said ears having portions intermediate their ends, each of said ear portions only, being snugly disposed between the arms of one of said structures with the flat surfaces of said ears engaging said arms, said arms and said portions only, being undulatingly deformed along said arms and in phase relation, said undulating deformation interlocking said ears and said arms to prevent displacement of said ears along and transversely of said arms, whereby said deformation fixes said U-shaped member to said trough after said trough is filled with getter material with reduced harm to said material and provides an electrically continuous loop including said trough for effective heating of said getter material by electrical induction.

2. Method of making a getter assembly comprising the steps of feeding getter material to a continuous stock of similar open troughs joined by elongated flat ears while unavoidably contaminating said ears with said material; feeding a plurality of spaced wire-like loop members each having a U-shaped structure including a transverse portion longer than one of said troughs, and legs terminating in U-shaped hooks having parallel arms, to cause said U-shaped hooks to receive two adjacent ones of said ears between said arms; pressing said arms in a direction normal to said adjacent ears to undulate said arms and a portion only of said ears in phase relation along said arms; and severing said adjacent ears in regions thereof spaced from said arms in directions remote from said trough; whereby said contaminated ears are effectively fixed to said arms against relative movement along and transversely of said arms.

References Cited in the file of this patent

UNITED STATES PATENTS

| | | |
|---|---|---|
| 1,733,882 | Illingworth | Oct. 29, 1929 |
| 1,973,038 | Benedek | Sept. 11, 1934 |
| 2,097,467 | Prescott | Nov. 2, 1937 |
| 2,133,550 | Little | Oct. 18, 1938 |
| 2,217,205 | Prescott | Oct. 8, 1940 |
| 2,281,236 | Eckman | Apr. 28, 1942 |
| 2,281,237 | Eckman | Apr. 28, 1942 |
| 2,344,931 | Herzog et al. | Mar. 21, 1944 |
| 2,421,984 | Bobrow | June 10, 1947 |
| 2,551,299 | Sowa | May 1, 1951 |

FOREIGN PATENTS

| | | |
|---|---|---|
| 578,487 | Great Britain | July 1, 1946 |